(No Model.)
W. H. JENCKS.
DECOY.
No. 403,595. Patented May 21, 1889.
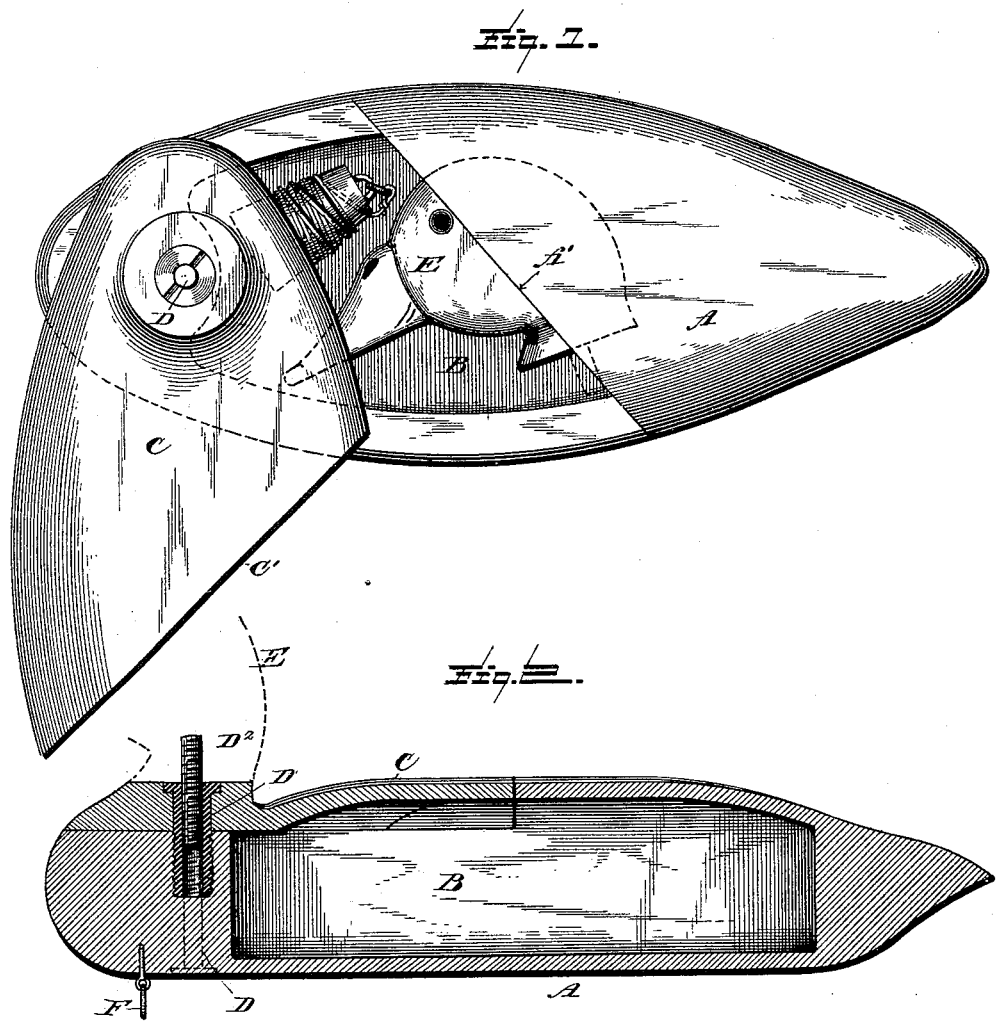
Witnesses,
L. C. Hills
H. Sutherland
Inventor,
William H. Jencks.
E. B. Stocking
Attorney

UNITED STATES PATENT OFFICE.

WILLIAM H. JENCKS, OF CLINTON, IOWA.

DECOY.

SPECIFICATION forming part of Letters Patent No. 403,595, dated May 21, 1889.

Application filed March 19, 1889. Serial No. 303,900. (No model.)

*To all whom it may concern:*

Be it known that I, WILLIAM H. JENCKS, a citizen of the United States, residing at Clinton, in the county of Clinton, State of Iowa, have invented certain new and useful Improvements in Decoys, of which the following is a specification, reference being had therein to the accompanying drawings.

My invention relates to certain improvements in decoys, whereby the same may be rendered more convenient for constant use, and whereby the danger of breaking and otherwise defacing the same is to a great extent obviated. To this end I have constructed my device as hereinafter described, and with certain novel features, which will appear in the claims at the end of this specification.

In the drawings, Figure 1 represents my decoy on the point of being closed for carriage, the same being shown in plan. Fig. 2 is a vertical longitudinal section of my decoy when ready for use.

A is the body of my decoy, showing the same as shaped for the decoy of ducks, said body being hollowed out into a chamber, B, as shown particularly in Fig. 2. Pivoted to a vertical pin just forward of this chamber is the cover C, which is provided with an edge, C', cut diagonally to fit the corresponding edge A' of the body A. This pin D is screw-threaded and upset at the end, forming really a bolt, which is driven through the body of the decoy from the under side, as shown, and having a screw-threaded portion projecting upward from the top of the body for the purpose of fastening the head of the duck or decoy. This pin D may be fashioned in various ways and modified for various changes in the disposition of the parts of the decoy. A preferred form is shown in Fig. 2, where D' represents a collar which has a female screw within and a male screw without for the purpose of inserting the collar firmly in the body, as shown. Within this collar a bolt, $D^2$, is screwed more or less tightly until a portion of said bolt is concealed by the body of the decoy within the collar D'. The rest of the body of the bolt projects into the head E, as shown in Fig. 2, and is designed to preferably remain there when said head is removed, as shown in Fig. 1. This can be accomplished by making the threads of the head tighter than those of the body, thus making the bolt stick in the head when unscrewed from the body. Of course, this bolt $D^2$ may be fixed within the head of the decoy, instead of being screwed therein, and thus all danger of its being left in the collar obviated. By this means there will be no projecting bolt at the end of the decoy, as the said bolt will be removed with the head.

Under the forward end of the duck or decoy there is a fastening, preferably a ring, F, for the purpose of holding the anchor-rope, by means of which the said decoy is held in place on the water. This anchor is easily detachable and may be placed within the body of the duck, as shown in Fig. 1, and indeed is so placed.

Now, when this decoy comes to be used, it may be carried to the place of concealment of the hunter without danger of the breakage of any parts whatever. Hitherto these have always been carried by the hunters in bags, with the anchor-rope wound around the body of the decoy and the anchor left at the end of the same. The decoys thus lying together and being subjected to violent jars by reason of the rough country through which hunters are forced to travel, the heads particularly have been extremely subject to breakage, which of course renders the whole device useless as a decoy, as most of the resemblance depends upon the natural position and carving of the head.

My decoys may be safely carried within a bag in any numbers without any danger of this mutilation. To fit the decoy for carriage, the head is removed, as is also the anchor, together with its rope, which is wound around the same, as shown in Fig. 1. Both the head and the anchor are then put into the body of the duck and cover closed, in the position shown in Fig. 2. When the hunter arrives at the place of exposure of the decoy, the head is adjusted in place, the anchor tied to the ring F, and the lid closed, when the decoy can be floated immediately.

There are many details which may be varied by the exercise of mechanical skill, and therefore I do not wish to be understood as limiting myself to every detail herein shown and described.

What I claim is—

1. A decoy-body hollowed out and having a lid, in combination with a removable head, substantially as described.

2. A decoy-body hollowed out and a pivoted lid for the same, in combination with a removable head, substantially as described.

3. A decoy-body hollowed out, and a lid pivoted upon a pin on the forward end of the same and having a diagonal edge, in combination with a removable head screwed onto the pivot of said lid, substantially as described.

4. A decoy-body having a collar, D', screwed into its forward end, in combination with a bolt screwing into said collar, and a removable head into which said bolt is fixed, substantially as described.

5. A decoy-body of the class described, said body being hollowed out, a collar screwed into the forward end of the same, and a lid pivoted upon said bolt, in combination with a bolt screwing into said collar, and a removable head screwing over said bolt, substantially as described.

In testimony whereof I affix my signature in presence of two witnesses.

WILLIAM H. JENCKS.

Witnesses:
M. A. DOLAN,
JOHN JACKSON.